United States Patent [19]
Tazartes et al.

[11] Patent Number: 6,008,903
[45] Date of Patent: Dec. 28, 1999

[54] METHOD FOR COMPENSATING FOR FRINGE VISIBILITY ERRORS IN A FIBER-OPTIC GYRO

[75] Inventors: Daniel A. Tazartes, West Hills; Peter Kyriacou, Sun Valley; John G. Mark, Pasadena, all of Calif.

[73] Assignee: Litton Systems Inc., Woodland Hills, Calif.

[21] Appl. No.: 09/188,821

[22] Filed: Nov. 9, 1998

[51] Int. Cl.$^6$ ................................................... G01B 19/72
[52] U.S. Cl. ............................................................ 356/350
[58] Field of Search .............................................. 356/350

[56] References Cited

U.S. PATENT DOCUMENTS

| | | | |
|---|---|---|---|
| 5,682,241 | 10/1997 | Mark et al. | 356/350 |
| 5,684,589 | 11/1997 | Mark et al. | 356/350 |

OTHER PUBLICATIONS

Optical Fiber Rotation Sensing, editor W. Burns, Academic Press, pp. 31–79, and 175–208, 1994.

*Primary Examiner*—Samuel A. Turner
*Attorney, Agent, or Firm*—Robert E. Malm

[57] ABSTRACT

The invention is a method for compensating for fringe visibility errors in a fiber-optic gyro. The light beam phase is modulated utilizing a phase-modulation generating function comprising a stepped waveform with steps of height $2\pi k - \phi_{SE} + j\phi_M - \gamma_{ZS}$ at time intervals $\tau$ where a phase step $\phi$ specified by the phase-modulation generating function is transformed into a change in light-beam phase of $(\phi_X/X)\phi_X$ where $\phi_X$ is the change in light phase produced by a phase step X. The integer k takes on the value $-1$, 0, or 1, j takes on the value $-1$ or 1, $\phi_{SE}$ is a phase determined by the fiber-optic gyro, $\phi_M$ is a predetermined phase value, and $\gamma_{ZS}$ is a phase designed to compensate for the fringe visibility errors. The phase $\gamma_{ZS}$ represents a small perturbation to the modulation and is a function of zone Z and state S where the zone identifier Z and state identifier S denote one of a plurality of operating conditions of the fiber-optic gyro. The zone identifier Z depends on the relative magnitudes and signs of $\phi_{SE}$ and $\phi_M$, and the state identifier S is a function of k and j. Estimates of the Sagnac residual phase compensated for fringe visibility errors are then obtained by adding calculated fringe visibility compensation terms to $\phi_{SE}$.

17 Claims, 1 Drawing Sheet

METHOD FOR COMPENSATING FOR FRINGE VISIBILITY ERRORS IN A FIBER-OPTIC GYRO

BACKGROUND OF INVENTION

This invention relates generally to fiber-optic gyros and more specifically to the signal processing associated with fiber-optic gyros.

Fiber-optic gyros measure rate of rotation by determining the phase difference in light waves that propagate in opposite directions through a coil wound with optical fiber. Light waves that propagate through the coil in the direction of rotation take a longer time than light waves that propagate through the coil in the direction opposite to the direction of rotation. This difference in time, measured as the phase difference between counter-propagating light waves, is proportional to the angular velocity of the coil.

A typical block diagram for a fiber-optic gyro is shown in FIG. 1. A light source 2 supplies a reasonably coherent light beam to the optical-fiber interferometer 4 which causes the input light beam to be split into twvo light beams that are fed into opposite ends of an optical fiber configured as a coil. The light beams emerging from opposite ends of the optical fiber are recombined into a single output light beam that feeds into the detector 6.

The detected light intensity I (i.e. output of the detector 6) is given by $$I = \frac{I_o}{2}[1 + \cos\theta(t)] \tag{1}$$

where $I_o$ is the peak detected light intensity and $\theta(t)$ is the phase difference between the two beams expressed as a function of time.

The phase difference $\theta(t)$ typically takes the form $$\theta(t) = [\Phi(t)]_{mod2\pi} - [\Phi(t-\tau)]_{mod2\pi} + \phi_S + 2\pi n \tag{2}$$

where $\Phi(t)$ is the phase-modulation generating function and $\Phi(t)_{mod2\pi}$ is the phase modulation introduced by a phase modulator at one end of the fiber-optic coil in the interferometer 4, $\tau$ is the propagation time through the fiber optic coil, and $(\phi_S + 2\pi n)$ is the so-called Sagnac phase resulting from the rotation of the fiber-optic coil about its axis. The integer n (called the Sagnac fringe number) is either positive or negative and the Sagnac residual phase $\phi_S$ is constrained to the range $-\pi \leq \phi_S < \pi$.

The output of the detector 6 is high-pass filtered to remove the DC component, then converted to digital form by the analog-to-digital converter 8, and finally processed in the digital processor 10 to yield at the output a measure of the rate and angle of rotation of the interferometer 4. In addition, the digital processor 10 generates a phase-modulation generating function $\Phi(t)$, the modulo-$2\pi$ portion of which is converted to analog form by the digital-to-analog converter 12 and supplied to the phase modulator in the interferometer 4.

The phase-modulation generating function $\Phi(t)$ typically consists of a number of phase-modulation components among which are $\Phi_{SE}(t)$ and $\Phi_M(t)$. The phase-modulation component $\Phi_{SE}(t)$ is typically a stepped waveform with steps that change in height by $-\phi_{SE}$ at $\tau$ intervals where $\phi_{SE}$ is an estimate of $\phi_S$. Thus, the $\Phi_{SE}(t)$ modulation cancels in large part $\phi_S$. The accurate measurement of the uncancelled portion of the Sagnac residual phase $\phi_S$ is of great importance in that it is the quantity that is used in refining the estimate of the Sagnac phase and generating the $\Phi_{SE}(t)$ phase-modulation component.

The accurate measurement of the uncancelled portion of the Sagnac residual phase is greatly facilitated by choosing the $\Phi_M(t)$ phase-modulation component such that $[\Phi_M(t) - \Phi_M(t-\tau)]$ is equal to $j\phi_M$ where the permitted values of j are the values $-1$ and $1$ and $\phi_M$ is a predetermined positive phase angle somewhere in the vicinity $\pi/2$ radians where the slope of the cosine function is greatest. This effect can be achieved, for example, by having $\Phi_M(t)$ be a square wave with amplitude $\pi/2$ and period $2\tau$.

While it might appear that the best choice for $\phi_M$ would be $\pi/2$ where the slope of the cosine function is greatest, it has been shown that values between $\pi/2$ and $\pi$ provide better noise performance.

The $\Phi_M(t)$ modulation can also be a stepped function wherein the phase increases or decreases at $\tau$ intervals by $\phi_M$. Under these circumstances, $$[\Phi(t)]_{mod2\pi} - [\Phi(t-\tau)]_{mod2\pi} = 2\pi k - \phi_{SE} + j\phi_M \tag{3}$$

Substituting these expressions in equation (2), we obtain $$\theta = 2\pi(k+n) + j\phi_M \tag{4}$$

The equation above is the ideal phase difference equation, where $\phi_S - \phi_{SE} = 0$. For fiber-optic closed-loop calculation, two control parameters are inserted into the phase difference equation with the following result:

$$\theta = (2\pi k + j\phi_M)\left(1 + \frac{\delta}{\pi}\right) + \varepsilon + 2\pi n \tag{5}$$

The rebalance phase error $\epsilon$ is given by $$\epsilon = \phi_S - \phi_{SE} \tag{6}$$

and the phase modulator scale factor error $\delta/\pi$ is given by $$\frac{\delta}{\pi} = \frac{\phi_X}{X} - 1 \tag{7}$$

where $\phi_X$ is the change in light phase caused by a phase modulation step intended to produce a change of X radians. Note that if $\phi_X$ were correct and equal to X, then $\delta$ would be equal to zero.

The parameters $\phi_{SE}$ and $\phi_X$ (for a particular X) are driven by control loops to force the two demodulated signals to zero. TFhe rebalance phase demodulation equation is $$\sum_{j,k} p_{kj} j(I_{kj} - I_{av}) = 0 \tag{8}$$

and the scale factor demodulation equation is $$\sum_{j,k} p_{kj} D_{kj}(I_{kj} - I_{av}) = 0 \tag{9}$$

where $p_{kj}$ is the probability of occurrence of each state, $D_{kj}$ is the scale factor demodulation polarity, $I_{kj}$ is the detected light intensity which may be a function of k and j, and $I_{av}$ is the average of $I_{kj}$. The quantity $I_{kj} - I_{av}$ is the amplitude of the signal that results from the high-pass filtering of the output signal from detector 6.

Fiber optic gyros generally employ broadband light sources in order to avoid polarization cross-coupling effects as the light propagates through the fiber. As a result, however, coherence is lost as non-reciprocal phase shifts between the clockwise and counter-clockwise beams are introduced. This leads to the "fringe visibility effect" whereby the interference pattern between the two beams loses contrast as the difference in optical paths increases.

SUMMARY OF THE INVENTION

The invention is a method for compensating for fringe visibility errors in a fiber-optic gyro. The light beam phase is modulated utilizing a phase-modulation generating function comprising a stepped waveform with steps of height $2\pi k - \phi_{SE} + j\phi_M - \gamma_{ZS}$ at time intervals $\tau$ where a phase step $\phi$ specified by the phase-modulation generating function is transformed into a change in light-beam phase of $(\phi_X/X)\phi$ where $\phi_X$ is the change in light phase produced by a phase step X. The integer k takes on the value −1, 0, or 1, j takes on the value −1 or 1, $\phi_{SE}$ is a phase determined by the fiber-optic gyro, $\phi_M$ is a predetermined phase value, and $\gamma_{ZS}$ is a phase designed to compensate for the fringe visibility errors. The phase $Y_{ZS}$ represents a small perturbation to the modulation and is a function of zone Z and state S where the zone identifier Z and state identifier S denote one of a plurality of operating conditions of the fiber-optic gyro. The zone identifier Z depends on the relative magnitudes and signs of $\phi_{SE}$ and $\phi_M$, and the state identifier S is a function of k and j. Estimates of the Sagnac residual phase compensated for fringe visibility errors are then obtained by adding calculated fringe visibility compensation terms to $\phi_{SE}$.

DESCRIPTION OF THE PREFERRED EMBODIMENT

Figure 1:
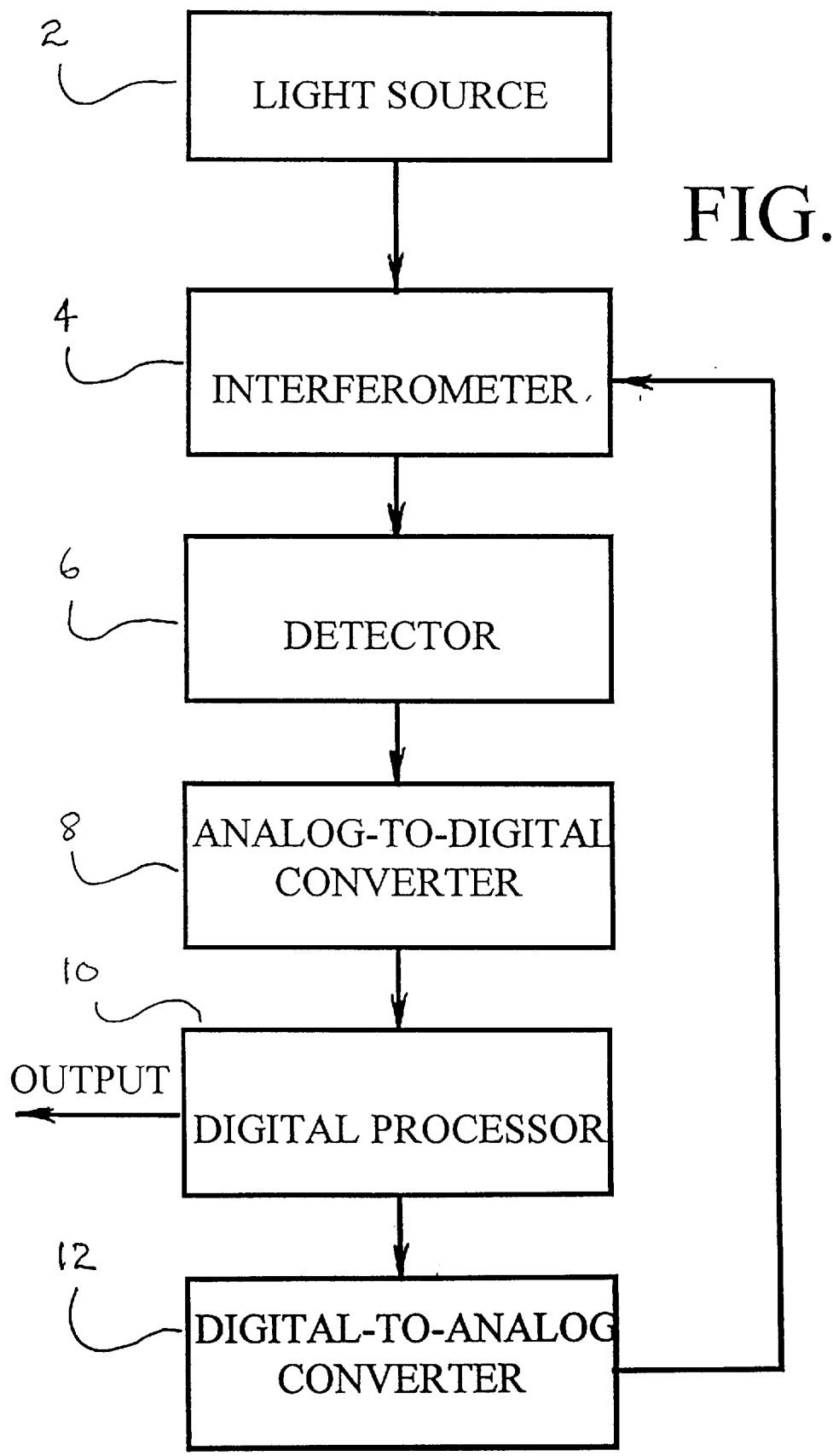
FIG. 1 is a block diagram of a fiber-optic gyro and associated control loop.

It can be shown that given a broadband source, equation (1) becomes (ignoring powers of θ-squared greater than one)

$$I = \frac{I_o}{2}[1 + (1 - \alpha\theta^2)\cos\theta] \qquad (10)$$

While this equation is an approximation, it holds relatively well for typical fiber-optic gyro sources whose line-widths are on the order of 1% of the wavelength.

With $\phi_M$ equal to an odd-integer multiple of π/2 radians, the fringe visibility error vanishes because cos θ equals zero. For other values of $\phi_M$ in a closed-loop fiber-optic gyro operating within the confines of a single fringe ($-\pi \leq \phi_S < \pi$) the effect manifests itself as a bias error that is rate-dependent and normally appears as a simple scale-factor miscalibration. However, for multiple fringe operation (n>1), the effect manifests itself as a bias error which is a function of phase shift within a fringe. Multiple-fringe operation is especially important in gyros with large Sagnac scale factors, the Sagnac scale factor being the ratio of the Sagnac phase to the rotation rate of the fiber-optic gyro.

The error in the detected light intensity I from detector 6 resulting from fringe visibility can be calculated in the following way. Using equations (4) and (10), we can obtain the intensity error due to fringe visibility for a fiber-optic gyro operating with a modulation amplitude $\phi_M$.

$$-\left(\frac{I_0}{2}\alpha\cos\theta\right)\theta^2 = \frac{I_0}{2}\sin\phi_M(P_{nkj} + l) \qquad (11)$$

where we have dropped second-order terms. The quantity $P_{nkj}$ is given by the expression $$P_{nkj} = S(n+k)(n+k+jr) \qquad (12)$$

where $$S = -4\pi^2\alpha\cot\phi_M \qquad (13)$$

and $$r = \frac{\phi_M}{\pi} \qquad (14)$$

The symbol l denotes the average detected light intensity level shift due to fringe visibility (i.e. those terms of equation (11) which do not depend on j, k, and n).

In order to constrain $[\Phi_M(t)]_{mod2\pi}$ to the range from 0 to a value less than $2\pi$, k must satisfy the following relationship:

$$k = h - c \qquad (15)$$

where $$h = \text{SGN}(-\phi_{SE} + j\phi_M): h=0 \text{ denotes}+; h=1 \text{ denotes}-. \qquad (16)$$

$$c=0;\{[\Phi(t-r)]_{mod2\pi}+2\pi h-\phi_{SE}+j\phi_M\}<2\pi c=1; \text{ otherwise} \qquad (17)$$

It can be shown that if the gyro loops described by equations (8) and (9) are satisfied, the total detected light intensity will be a function of the modulation point defined by j and k. The present invention introduces a new parameter $\gamma_{ZS}$ into the modulation to ensure constant intensity irrespective of modulation state. The symbol Z denotes a particular zone and S, a function of j and k, denotes a particular state. To perform this function it is necessary to separate modes of operation into three zones defined as follows:

Zone 1: $-\phi_M \leq \phi_S \leq \phi_M$

Zone 2: $-\pi \leq \phi_S < -\phi_M$

Zone 3: $\phi_M < \phi_S < \pi$

Modifying equation (5) to include $\gamma_{ZS}$, we obtain $$\theta = (2\pi k + j\phi_M)\left(1 + \frac{\delta}{\pi}\right) + \varepsilon + 2\pi n - \gamma_{ZS} \qquad (18)$$

Combining equations (10) and (18), we obtain $$I = \frac{I_0}{2}\sin\phi_M(P_{nkj} + l_z) - \qquad (19)$$

$$\frac{I_0}{2}\sin\phi_M\left(2jk\delta + \frac{\phi_M}{\pi}\delta + j\varepsilon - j\gamma_{ZS}\right) + \text{DC intensity}$$

The introduction of the parameter $\gamma_{ZS}$ results in l being a function of Z and this quantity will henceforth be denoted by $l_Z$.

The DC intensity in equation (19) is that attributable to a perfect interferometer described by equation (1). Since the high-pass filtering of the output of detector 6 removes the DC components, we will henceforth ignore the DC components attributable to a perfect interferometer. We will continue to show the DC components $l_Z$ arising from fringe visibility effects for reasons that will become clear later.

The quantity $P_{nkj}+l_Z$ is the error in the detected light intensity I due to fringe visibility effects expressed in units of $$\frac{I_0}{2}\sin\phi_M.$$

The following state equations for Zone 1 follow from equation 19.

State A ($k=1, j=-1$): $I_{jk}=P_{nkj}+\epsilon+(2-r)\delta+l_1-\gamma_{1A}$

State B ($k=0, j=1$): $I_{jk}=P_{nkj}-\epsilon-r\delta+l_1+\gamma_{1B}$

State C ($k=0, j=-1$): $I_{jk}=P_{nkj}+\epsilon-r\delta+l_1-\gamma_{1C}$

State D ($k=-1, j=1$): $I_{jk}=P_{nkj}-\epsilon+(2-r)\delta+l_1+\gamma_{1D}$ (20)

where we recognize the dependency of I on the state S by including the subscripts j and k. The quantity $l_Z$ is a light intensity adjustment. The inclusion of $l_Z$ permits a unique solution of the equations for $I_{jk}$ equal to a constant for all states. The quantity $l_Z$ is of no operating significance because of the high-pass filtering of the output from detector 6. Setting $$\gamma_{1A}=\gamma_{1D}=-\gamma_{1B}=-\gamma_{1C}=\gamma \quad (21)$$

results in the γ "vector" being orthogonal to the control parameter "vectors" $\epsilon$, $\delta$, and $l_1$. Solving the above equations for the compensation parameters for $I_{jk}=0$, we obtain $$\epsilon = Sn(r-1);\ \delta = \frac{S}{2}(r-1);\ l_1 = \frac{S}{2}(r^2-r-2n^2) \quad (22)$$

$$\gamma = Sn$$

The closed-loop equations for zone 2 are

State B ($k=0, j=1$): $I_{jk}=P_{nkj}-\epsilon-r\delta+l_2+\gamma_{2B}$

State C ($k=0, j=-1$): $I_{jk}=P_{nkj}+\epsilon-r\delta+l_2-\gamma_{2C}$

State D ($k=-1, j=1$): $I_{jk}=P_{nkj}-\epsilon+(2-r)\delta+l_2+\gamma_{2D}$

State E ($k=-1, j=-1$): $I_{jk}=P_{nkj}+\epsilon-(2+r)\delta+l_2-\gamma_{2E}$ (23)

The above equations for zone 2 could be solved with various combinations of $\gamma_{2S}$. However, it is desirable to maintain the expressions for $\epsilon$ and $\delta$ the same for all zones in order to preserve continuity. Consequently, $\epsilon$ and $\delta$ are assigned the same values as for Zone 1 in solving the above equations for the control parameters $l_2$ and $\gamma_{2S}$. We also require that $$\sum_j j\gamma_{ZS} = 0 \quad (24)$$

The solution of equations (23) under these circumstances are $$l_2 = \frac{S}{2}(r^2-r-1+2n-2n^2) \quad (25)$$

$$\gamma_{2B} = -\frac{S}{2}(4n-1)$$

$$\gamma_{2C} = -\frac{S}{2}$$

$$\gamma_{2D} = \frac{S}{2}$$

$$\gamma_{2E} = -\frac{S}{2}(4n-3)$$

The closed-loop equations for zone 3 are

State Z ($k=1, j=1$): $I_{jk}=P_{nkj}-\epsilon-(2+r)\delta+l_3+\gamma_{3Z}$

State A ($k=1, j=-1$): $I_{jk}=P_{nkj}+\epsilon+(2-r)\delta l_3-\gamma_{3A}$

State B ($k=0, j=1$): $I_{jk}=P_{nkj}-\epsilon-r\delta+l_3+\gamma_{3B}$

State C ($k=0, j=-1$): $I_{jk}=P_{nkj}+\epsilon-r\delta+l_3-\gamma_{3C}$ (26)

As in the case of zone 2, the above equations for zone 3 could be solved with various combinations of $\gamma_{3S}$. However, as we mentioned previously, it is desirable to maintain the expressions for $\epsilon$ and $\delta$ the same for all zones in order to preserve continuity. Consequently, in solving the above equations for the control parameters $l_3$ and $\gamma_{3S}$, we again assign values to $\epsilon$ and $\delta$ corresponding to those for zone 1 and we again require that equation (24) holds. Solving the above equations for the control parameters $l_3$, and $\gamma_{3S}$, we obtain $$l_3 = \frac{S}{2}(r^2-r-1-2n-2n^2) \quad (26)$$

$$\gamma_{3Z} = -\frac{S}{2}(4n+3)$$

$$\gamma_{3A} = -\frac{S}{2}$$

$$\gamma_{3B} = \frac{S}{2}$$

$$\gamma_{3C} = -\frac{S}{2}(4n+1)$$

The $\gamma_{ZS}$ corrections are applied with an algorithm using S determined from calibration, and the fringe number n. Typically, the phase ramp integration performed by the digital processor 10 rolls over at $2\pi$ intervals. In the event that the integration is near a rollover boundary, the addition of the correction term can induce a rollover that also causes a state change. Such an occurrence invalidates the very correction that induced it. To avoid this paradox, the algorithm uses a range slightly greater than $2\pi$. If the addition of a correction induces a rollover, the algorithm will back out the rollover for that specific iteration but will register it and allow it to happen on the following iteration. For this following iteration, it is known in advance that a rollover will occur and an additional correction is applied thereby accounting for the state change. This additional correction is dependent on the current state as well as the polarity of the original correction. The additional corrections for each state are listed below, according to the polarity of the original correction.

| State | (+) Correction | (−) Correction |
|-------|----------------|----------------|
| Z     | −2S(n+1)       | 2S(n+2)        |
| A     | 2Sn            | −2S(n+1)       |
| B     | −2Sn           | 2S(n+1)        |

-continued

| State | (+) Correction | (−) Correction |
|-------|----------------|----------------|
| C | 2S(n−1) | −2Sn |
| D | −2S(n−1) | 2Sn |
| E | 2S(n−2) | −2S(n−1) |

What is claimed is:

1. A method for compensating for fringe visibility errors in a fiber-optic gyro comprising the following steps:
   (a) modulating the light phase with a stepped waveform, each step of the stepped waveform including a plurality of step components, at least one of the step components being dependent on the magnitude $\alpha$ of the fringe visibility effect;
   (b) obtaining an estimate of the Sagnac residual phase $\phi_S$ and an estimate of the scale factor $\phi_X/X$, $\phi_X$ being the change in light phase produced by a step having a height intended to produce a change in light phase X.

2. The method of claim 1 wherein step (b) includes the steps:
   (b1a) causing the fiber-optic gyro to maintain a parameter $\phi_{SE}$ equal to the difference of the Sagnac residual phase $\phi_S$ and a fringe visibility compensation component $\epsilon$;
   (b1b) calculating $\epsilon$;
   (b1c) obtaining an estimate of the Sagnac residual phase $\phi_S$ by adding $\epsilon$ to $\phi_{SE}$.

3. The method of claim 2 wherein step (b) includes the step:
   (b3) maintaining a record of the current fringe number n, $\epsilon$ being a function of the fringe number n, the predetermined height $\phi_M$ of a step component, and the magnitude $\alpha$ of the fringe visibility effect.

4. The method of claim 1 wherein step (b) includes the steps:
   (b2a) causing the fiber-optic gyro to maintain $(\phi_X/X)\pi$ equal to the sum of $\pi$ and a fringe visibility induced parameter $\delta$;
   (b2b) scaling each step height by $\phi_X/X$, the factor $\phi_X/X$ being obtained by adding 1 and $\delta/\pi$.

5. The method of claim 4 wherein step (b) includes the step:
   (b3) maintaining a record of the current fringe number n, the predetermined height $\phi_M$ of a step component, and the magnitude $\alpha$ of the fringe visibility effect.

6. The method of claim 1 wherein the fiber-optic gyro operates at any particular time in a zone Z and a state S, step (b) including the step:
   (b4) causing the detected light intensity I to be independent of S for a given Z by including a step component having a height $\gamma_{ZS}$ that is a function of zone and state.

7. The method of claim 1 wherein the fiber-optic gyro operates at any particular time in a zone Z and a state S and the height of each step is given by $2\pi k-\phi_{SE}+j\phi_M-\gamma_{ZS}$, $\phi_{SE}$ being an estimate of the Sagnac residual phase in the absence of fringe visibility error, $\phi_M$ being a predetermined phase value, Z depending on the relative magnitudes and signs of the Sagnac residual phase $\phi_S$ and $\phi_M$, S being a function of k and j, permissible values for k being −1, 0, and 1, permissible values for j being −1 and 1, $\gamma_{ZS}$ being a function of Z and S and being dependent on the magnitude $\alpha$ of the fringe visibility effect.

8. The method of claim 7 wherein step (b) includes the steps:
   (b1a) causing the fiber-optic gyro to maintain a parameter $\phi_{SE}$ equal to the difference of the Sagnac residual phase $\phi_S$ and a fringe visibility compensation component $\epsilon$;
   (b1b) calculating $\epsilon$;
   (b1c) obtaining an estimate of the Sagnac residual phase $\phi_S$ by adding $\epsilon$ to $\phi_{SE}$;
   (b2a) causing the fiber-optic gyro to maintain $(\phi_X/X)\pi$ equal to the sum of $\pi$ and a fringe visibility induced component $\delta$;
   (b2b) scaling each step height by $\phi_X/X$, the factor $\phi_X/X$ being obtained by adding 1 and $\delta/\pi$;
   (b3) maintaining a record of the current fringe number n, $\epsilon$ being a function of the fringe number n, the predetermined height $\phi_M$ of a step component, and the magnitude $\alpha$ of the fringe visibility effect.

9. The method of claim 8 wherein the values of $\gamma_{ZS}$ result in $\epsilon$ and $\delta$ being independent of Z and S.

10. The method of claim 8 wherein the values of $\gamma_{ZS}$ result in the light intensity being independent of S for every Z.

11. The method of claim 8 wherein $\epsilon$, $\delta$, $l_1$, and $\gamma_{1S}$ are obtained by solving the equations $P_{nS}-j\epsilon+(2|k|-r)\delta+l_1+j\gamma_{1S}=0$ when the fiber-optic gyro is operating in zone 1, r being equal to $\phi_M/\pi$, $P_{nS}$ denoting the detected light intensity bias resulting from fringe visibility effects for fringe number n and state S(k,j), (k,j) taking on the values (1,−1), (0,1), (0,−1), and (−1,1), the parameter $l_1$ being the average value of $P_{nS}$ over S.

12. The method of claim 8 wherein $\epsilon$, $\delta$, $l_2$, and $\gamma_{2S}$ are obtained by solving the equations $P_{nS}-j\epsilon+j(2|k|-jr)\delta+l_2+j\gamma_{2S}=0$ when the fiber-optic gyro is operating in zone 2, r being equal to $\phi_M/\pi$, $P_{nS}$ denoting the detected light intensity bias resulting from fringe visibility effects for fringe number n and state S(k,j), (k,j) taking on the values, (0,1), (0,−1), (−1,1), and (−1,−1), the parameter $l_2$ being the average value of $P_{nS}$ over S.

13. The method of claim 11 wherein $\epsilon$, $\delta$, $l_2$, and $\gamma_{2S}$ are obtained by solving the equations $P_{nS}-j\epsilon+j(2|k|-jr)\delta+l_2+j\gamma_{2S}=0$ when the fiber-optic gyro is operating in zone 2, $P_{nS}$ denoting the detected light intensity bias resulting from fringe visibility effects for fringe number n and state S(k,j), (k,j) taking on the values, (0,1), (0,−1), (−1,1), and (−1,−1), the parameter $l_2$ being the average value of $P_{nS}$ over S.

14. The method of claim 13 wherein $\epsilon$, $\delta$, $l_1$, and $\gamma_{1S}$ are obtained by solving the equations $P_{nS}-j\epsilon+(2|k|-r)\delta+l_1+j\gamma_{1S}=0$, the values of $l_2$ and $\gamma_{2S}$ then being obtained by substituting the already determined values for $\epsilon$ and $\delta$ in the equations $P_{nS}-j\epsilon+j(2|k|-jr)\delta+l_2+j\gamma_{2S}=0$ and solving for $l_2$ and $\gamma_{2S}$.

15. The method of claim 8 wherein $\epsilon$, $\delta$, $l_3$, and $\gamma_{3S}$ are obtained by solving the equations $P_{nS}-j\epsilon-j(2|k|+jr)\delta+l_3+j\gamma_{3S}=0$ when the fiber-optic gyro is operating in zone 3, r being equal to $\phi_M/\pi$, $P_{nS}$ denoting the detected light intensity bias resulting from fringe visibility effects for fringe number n and state S(k,j), (k,j) taking on the values (1,1), (1,−1), (0,1), and (0,−1), the parameter $l_3$ being the average value of $P_{nS}$ over S.

16. The method of claim 11 wherein $\epsilon$, $\delta$, $l_3$, and $\gamma_{3S}$ are obtained by solving the equations $P_{nS}-j\epsilon-j(2|k|+jr)\delta+l_3+j\gamma_{3S}=0$ when the fiber-optic gyro is operating in zone 3, $P_{nS}$ denoting the detected light intensity bias resulting from fringe visibility effects for fringe number n and state S(k,j), (k,j) taking on the values (1,1), (1,−1), (0,1), and (0,−1), the parameter $l_3$ being the average value of $P_{nS}$ over S.

17. The method of claim 16 wherein $\epsilon$, $\delta$, $l_{1S}$, and $\gamma_{1S}$ are obtained by solving the equations $P_{nS}-j\epsilon+(2|k|-r)\delta+l_1+j\gamma_{1S}=0$, the values of $l_3$ and $\gamma_{3S}$ then being obtained by substituting the already determined values for $\epsilon$ and $\delta$ in the equations $P_{nS}-j\epsilon-j(2|k|+jr)\delta+l_3+j\gamma_{3S}=0$ and solving for of $l_3$ and $\gamma_{3S}$.

* * * * *